Jan. 13, 1953

R. A. KEMPF 2,625,587

AUTOMATIC BRIDGE

Filed Nov. 9, 1950

| FIG.1 | FIG.2 | FIG.3 | FIG.4 |

INVENTOR
R. A. KEMPF
BY
Walter M. Hill
ATTORNEY

INVENTOR
R. A. KEMPF
BY Walter M. Hill
ATTORNEY

Jan. 13, 1953   R. A. KEMPF   2,625,587
AUTOMATIC BRIDGE
Filed Nov. 9, 1950   5 Sheets-Sheet 5
FIG. 8
| INPUT IMPULSE NO. | STAGE NO. CONDUCTING | | | | FIRST DECADE | | | | | | |
|---|---|---|---|---|---|---|---|---|---|---|---|
| | | | | | CAPACITANCE | | | CONDUCTANCE | | | |
| | $S_1$ | $S_2$ | $S_3$ | $S_4$ | RELAYS OPERATED | μμf SWITCHED | | RELAYS OPERATED | OHMS SWITCHED | |
| | | | | | | AD | CD | | AD | CD |
| RESET | R | R | R | R | 5 | 0 | 0 | 7 | 0 | 0 |
| 1 | L | R | R | R | 2,5 | 0 | 1000 | 10,7 | 0 | 10 |
| 2 | R | L | R | R | 3,5 | 0 | 2000 | 9,7 | 0 | 20 |
| 3 | L | L | R | R | 2,3,5 | 0 | 3000 | 10,9,7 | 0 | 30 |
| 4 | R | R | L | R | 4,5 | 0 | 4000 | 8,7 | 0 | 40 |
| 5 | L | R | L | R | 2,4,5 | 0 | 5000 | 10,8,7 | 0 | 50 |
| 6 | R | L | L | R | 1 | 0 | 0 | 6 | 0 | 0 |
| 7 | L | L | L | R | 2,1 | 1000 | 0 | 10,6 | 10 | 0 |
| 8 | R | R | R | L | 3,1 | 2000 | 0 | 9,6 | 20 | 0 |
| 9 | L | R | R | L | 2,3,1 | 3000 | 0 | 10,9,6 | 30 | 0 |
| 10 | R | L | R | L | 4,1 | 4000 | 0 | 8,6 | 40 | 0 |
| 11 | L | L | R | L | 2,4,1 | 5000 | 0 | 10,8,6 | 50 | 0 |
| 12 | R | R | L | L | 5 | 0 | 0 | 7 | 0 | 0 |
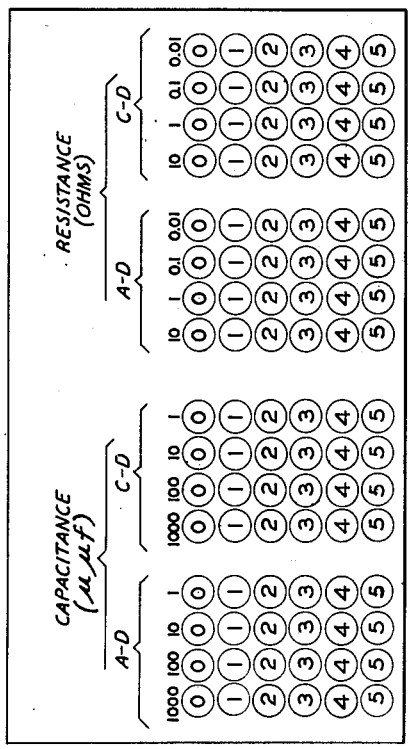
FIG. 7
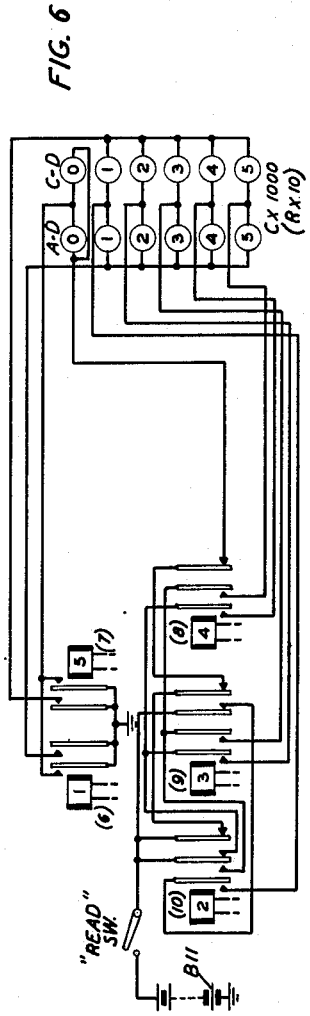
FIG. 6
INVENTOR
R. A. KEMPF
BY
Walter M. Hill
ATTORNEY Patented Jan. 13, 1953

2,625,587

UNITED STATES PATENT OFFICE 2,625,587

AUTOMATIC BRIDGE

Raymond A. Kempf, Baltimore, Md., assignor to Bell Telephone Laboratories, Incorporated, New York, N. Y., a corporation of New York Application November 9, 1950, Serial No. 194,907

5 Claims. (Cl. 175—183)

This invention relates to the art of electrical measurements and more particularly to an automatic balancing means for an alternating-current bridge or other null circuit.

It is frequently necessary in manufacturing operations to make bridge measurements of a complex admittance or impedance. In many cases these measurements must be made on each unit of the manufactured product. Unless the measurements can be made with speed, without sacrifice of accuracy, the cost of measurement becomes significantly large. Moreover, operator fatigue and inaccuracies resulting therefrom are the obvious consequences of repeatedly making large numbers of such measurements under purely manual control. An outstanding example of a manufacturing process involving bridge measurements is the manufacture of telephone cable. The testing procdure usually consists of measuring the capacitance and conductance components of the admittance of each cable pair. Additional measurements between pairs are also frequently made. In all such manufacturing operations the measurments necessarily are great in number and quite time consuming. Operator fatigue thus becomes a critically important factor. It is, therefore, highly desirable that an automatic means be provided for balancing such a bridge as to both components.

It is the object of this invention to provide an automatic balancing means for balancing both components of a complex admittance or impedance.

The foregoing object is achieved by this invention which provides in combination a plurality of standard electric circuit elements of one kind, a plurality of standard electric circuit elements of a different kind, a detector means connected to a circuit including said elements and responsive to the null condition thereof, a switching means connected to and controlled by the detector means and also connected to all of said standard elements, said means being so constructed and arranged to sequentially connect each of one kind of element into the circuit once for each similar connection of an element of said different kind, said sequence of connections continuing until substantial balance for said two kinds of elements is detected by the detector means whereupon the detector means automatically stops the switching operation. Means is also provided for connecting the elements of each kind into successive decades, each having its own detector means which both stops the switching operation of its own decade and starts the switching of the next succeeding decade.

The invention may be better understood by referring to the accompanying drawings in which:

Figs. 1, 2, 3 and 4 disclose a preferred embodiment of the invention;

Fig. 5 shows how Figs. 1 to 4, inclusive, are related;

Fig. 6 dicloses an indicator circuit which may be used in connection with the relay circuits of Figs. 1 and 2;

Fig. 7 shows the complete lamp arrangement for the apparatus of Fig. 6; and

Fig. 8 is a table showing the sequence of the operation of the relays and relay selectors of the first decade specifically shown in Figs. 1 and 3.

Figures 1, 5:
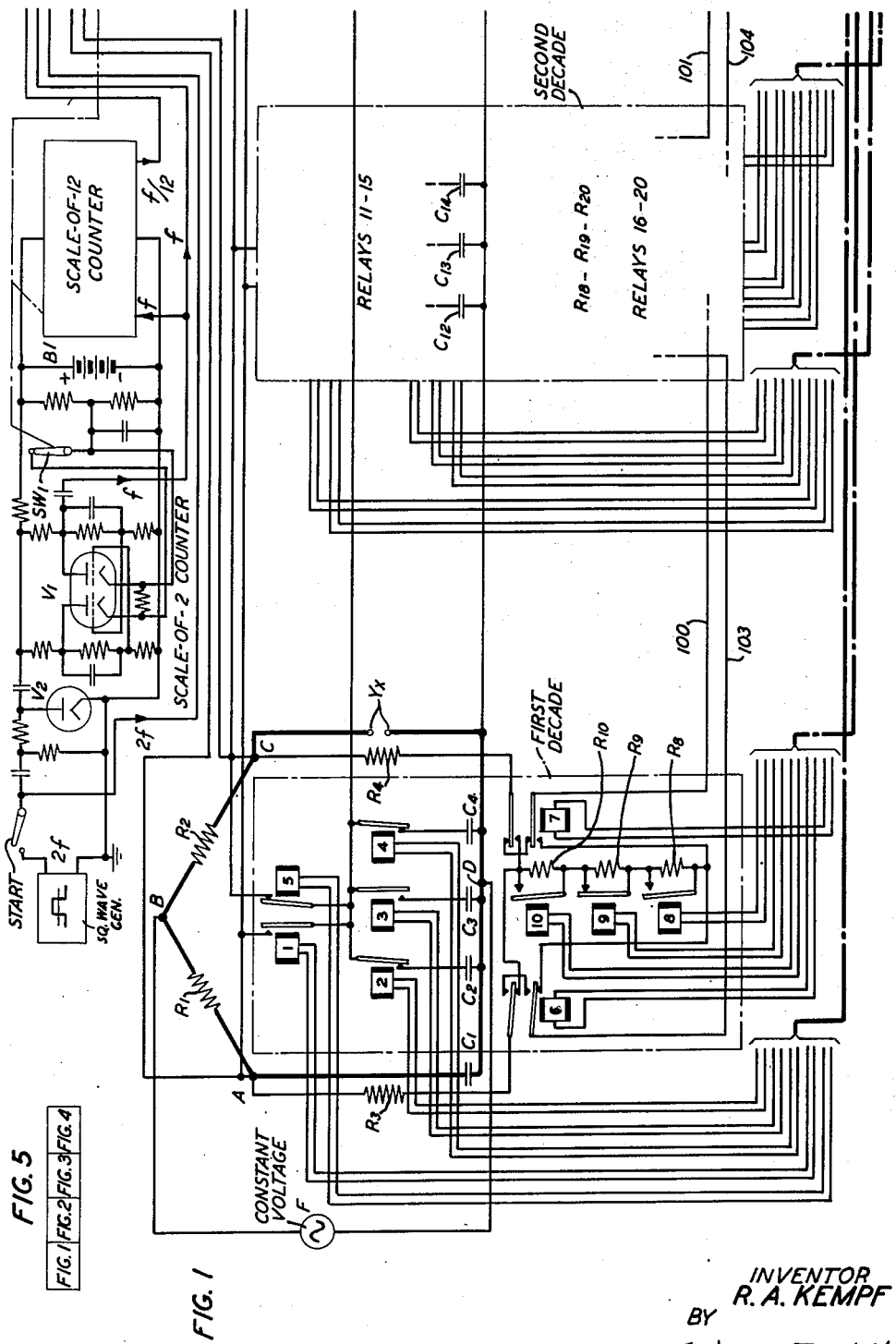

Referring now specifically to Figs. 1 to 4, ininclusive, which should be arranged in the order shown in Fig. 5, it will be noted that a conventional bridge network comprising the four terminals A, B, C and D is shown near the left-hand side of Fig. 1. In this bridge network resistors $R_1$ and $R_2$ constitute the ratio arm resistors. For the specific embodiment here used for illustrative purposes, it is assumed that these two resistors are of equal value. A fixed standard capacitor $C_1$ is connected in the A—D arm of the bridge. Additional standard capacitor elements $C_2$, $C_3$ and $C_4$, respectively, may be connected across either the A—D arm of the bridge or across the C—D arm depending upon whether or not transfer relay 1 or transfer relay 5 is operated. These relays are termed "transfer" relays because their function is to transfer from the A—D arm to the C—D arm those relay circuits which connect capacitors $C_2$, $C_3$ and $C_4$ into the bridge. Capacitors $C_2$, $C_3$ and $C_4$ are connected into circuit by their associated relays 2, 3 and 4. If transfer relay 1 is operated, relays 2, 3 and 4 will selectively connect their capacitors across the A—D arm of the bridge. On the other hand if transfer relay 5 is operated these relays will connect their associated capacitors across the C—D arm.

A fixed standard resistor $R_3$ is connected permanently to the A terminal of the bridge while another fixed standard resistor $R_4$ is permanently connected to the C terminal of the bridge. The remaining terminal of each of these two resistors is connected either to the D terminal of the bridge or it is connected to one terminal of the series-connected standard resistors $R_8$, $R_9$ and $R_{10}$ through the contacts of either transfer relay 6 or transfer relay 7. Thus transfer relays 6 and 7 perform the same function for resistors $R_8$, $R_9$ and $R_{10}$ that relays 1 and 5 perform for the capacitors. The circuit to the D terminal of the bridge is not immediately obvious from this portion of the diagram but will become clear as the description proceeds with respect to the second, third and fourth decade relays shown on Figs. 1 and 2. It should be understood that the relay connections in each of the blocks for the second and third decades are identical with those already described for the first decade. As relays 8, 9 and 10 operate, their armatures disconnect the short circuits across their associated resistors thereby effectively inserting those resistors into the bridge circuit.

Note that the operation of the relays is such as to switch the capacitances $C_2$, $C_3$ and $C_4$ selectively in parallel. The conductance values, however, are actually obtained by switching resistances in series. These elements, if switched in parallel, as is usually done with conductances, would have very large values (in the megohm region) in order to obtain equivalent series increments corresponding to the 0.1 ohm range. If larger conductance steps are used, they may be connected in parallel as is shown for the capacitors.

As previously stated, the capacitors $C_{12}$, $C_{13}$ and $C_{14}$ and resistors $R_{18}$, $R_{19}$ and $R_{20}$ of the second decade, shown on the right-hand side of Fig. 1, are switched into the bridge circuit by relay circuits identical with those already described and disclosed for the first decade. The switching functions are performed by ten relays which are numbered 11 to 20, inclusive. This is also true of a third decade where capacitors $C_{22}$, $C_{23}$ and $C_{24}$ and resistors $R_{28}$, $R_{29}$ and $R_{30}$ are switched into the circuits by means of relays 21 to 30, inclusive. In accordance with conventional practice, the second decade capacitors $C_{12}$, $C_{13}$ and $C_{14}$ and the resistors $R_{18}$, $R_{19}$ and $R_{20}$ are each, respectively, one-tenth the corresponding values of those shown in the first decade. This is again true of the capacitors and resistors of the third and fourth decades which are each one-tenth of the values of the corresponding elements in the preceding decades. The relay switching circuits are shown in detail for the fourth decade for the purpose of completing some of the circuits which are carried through all four decades.

Before describing the manner in which the automatic switching operations are performed, typical circuits will be traced through the four decades already described. By way of a specific example illustrative of these circuits, it will be assumed that there is no unknown element connected to the test terminal Yx and that the bridge is designed for the measurement of telephone cables so that resistor $R_3$ may have a resistance of 10,000 ohms and resistor $R_4$ a resistance of 10,050 ohms. The fixed capacitor $C_1$ may be assumed to have a capacitance of 5000 micromicrofarads and capacitors $C_2$, $C_3$ and $C_4$ may each be assumed to have respectively 1000 micromicrofarads, 2000 micromicrofarads and 4000 micromicrofarads capacity. Resistors $R_{10}$, $R_9$ and $R_8$ may be respectively 10, 20 and 40 ohms. Under the conditions established for this illustration, the bridge relays must be so operated as to bring the bridge into balance when no admittance is connected to terminals Yx. When the circuit is started in operation transfer relays 5 and 7 of the first decade, 15 and 17 of the second decade, 25 and 27 of the third decade and 35 and 37 of the fourth decade are all caused to simultaneously operate. The manner in which this is done will be described in detail later. The balancing operation will then proceed automatically until the necessary relays are operated to bring the bridge into balance. The relays which must be operated to have the bridge in balance for both components are so shown in Figs. 1 and 2. By merely tracing the circuit it will be evident that the 5000-micromicrofarad capacitor $C_1$ in the A—D arm is balanced by the 1000 and 4000-micromicrofarad capacitors $C_2$ and $C_4$, respectively, which are connected by their relays in parallel with the C—D arm of the bridge. The circuit for capacitor $C_2$ may be traced from the D terminal of the bridge through the capacitor, through the contacts of relay 2, the contacts of relay 5 to the C terminal of the bridge. An identical circuit is traced through capacitor $C_4$ and the contacts of its associated relay 4.

Likewise it will be noted that the 10,050-ohm resistor $R_4$ is connected directly across the C—D arm of the bridge. This circuit may be traced as follows. Beginning with terminal C of the bridge, through resistor $R_4$, through the back contacts of both armatures of relay 7, through conductor 100, through the upper armature and front contacts of relay 17 (the circuits in this respect are identical with those of relay 37 shown in the fourth decade of Fig. 2), through the closed contacts of relays 18, 19 and 20 (again identical with the corresponding relays 38, 39 and 40 shown in the fourth decade of Fig. 2), through the front contacts of the lower armature of relay 17, to the conductor 101 which connects to the upper armature of relay 27 of the third decade where the circuit follows a path identical in kind to that already described for the second decade. From thence the path follows conductor 102 to the fourth decade, the upper armature and front contacts of relay 37, through the closed contacts of relays 38, 39 and 40 to the front contacts and lower armature of relay 37 to the D terminal of the bridge by way of an obvious circuit. Having just described this circuit it is evident that should any of the relays 18, 19, 20, 28, 29, 30, 38, 39 or 40 be operated, the resistance associated therewith will be connected in series with resistor $R_4$. In the present illustrative case these relays are all deenergized so that all of these resistors are short-circuited by their relay contacts. Thus resistor $R_4$ of 10,050 ohms is connected directly across the C—D arm and must be balanced by an equal resistance in the A—D arm. This is done by a series connection of resistor $R_3$ of 10,000 ohms and resistors $R_{10}$ and $R_8$ of 10 and 40 ohms, respectively.

A circuit path is similarly traced from the A terminal of the bridge, through resistor $R_3$, to the upper armature and front contact of relay 6, through resistor $R_{10}$, the closed contacts of relay 9, through resistor $R_8$ to the front contacts and lower armature of relay 6, by way of conductor 103 to the two back contacts of relay 16 of the second decade (these circuits are identical with those shown in detail in the fourth decade). From thence the path follows conductor 104 to the third decade, through the back contacts of relay 26 to conductor 105 and the back contacts of relay 36 from which the path leads directly to the D terminal of the bridge.

From the preceding description it will be evident that the fixed admittance components of the bridge are balanced by the operation of relays 2, 4, 5, 6, 8 and 10, it being observed that none of the circuit elements of the second, third and fourth decades are connected in the bridge circuit. It will also be evident from this example how the bridge capacitors $C_2$, $C_3$ and $C_4$ of the first decade may be connected in either the A—D or the C—D arm of the bridge depending upon whether transfer relay 1 or transfer relay 5 has operated. It will be equally evident how the bridge capacitors $C_{12}$, $C_{13}$ and $C_{14}$ of the second decade may be connected in either arm of the bridge independent of the arm in which the bridge capacitors of the first decade are connected. This is also true of the third and fourth decades. For each decade, the arm in which its capacitors are connected, is determined solely by the operation of its transfer relays corresponding with relays 1 and 5 of the first decade. Similarly the bridge resistors $R_{10}$, $R_9$ and $R_8$ may be connected in either arm of the bridge depending upon their transfer relays 6 and 7. The corresponding bridge resistors $R_{18}$, $R_{19}$ and $R_{20}$ of the second decade as well as those of the third and fourth decades are also independently connected in either arm of the bridge depending upon which of their respective transfer relays has operated.

The conductance and the capacitance of the unknown admittance connected to the Yx terminals are calculated in accordance with expressions (1) and (2) below:

$$G_X = \frac{1}{R_{AD}} - \frac{1}{R_{CD}} \quad (1)$$

where:

$G_X$ is the conductance of the unknown admittance connected to the test terminals Yx.
$R_{AD}$ and $R_{CD}$ are the total bridge resistances connected in the A—D and C—D arms, respectively.

$$C_X = C_{AD} - C_{CD} \quad (2)$$

where:

$C_X$ is the capacitance of the unknown admittance.
$C_{AD}$ and $C_{CD}$ are the total bridge capacitances connected in the A—D and C—D arms, respectively.

For the illustrative example given above where no unknown admittance is connected to the Yx terminals, the above expressions will give the conductance and the capacitance values as equal to zero which is as they should be.

Figure 2:
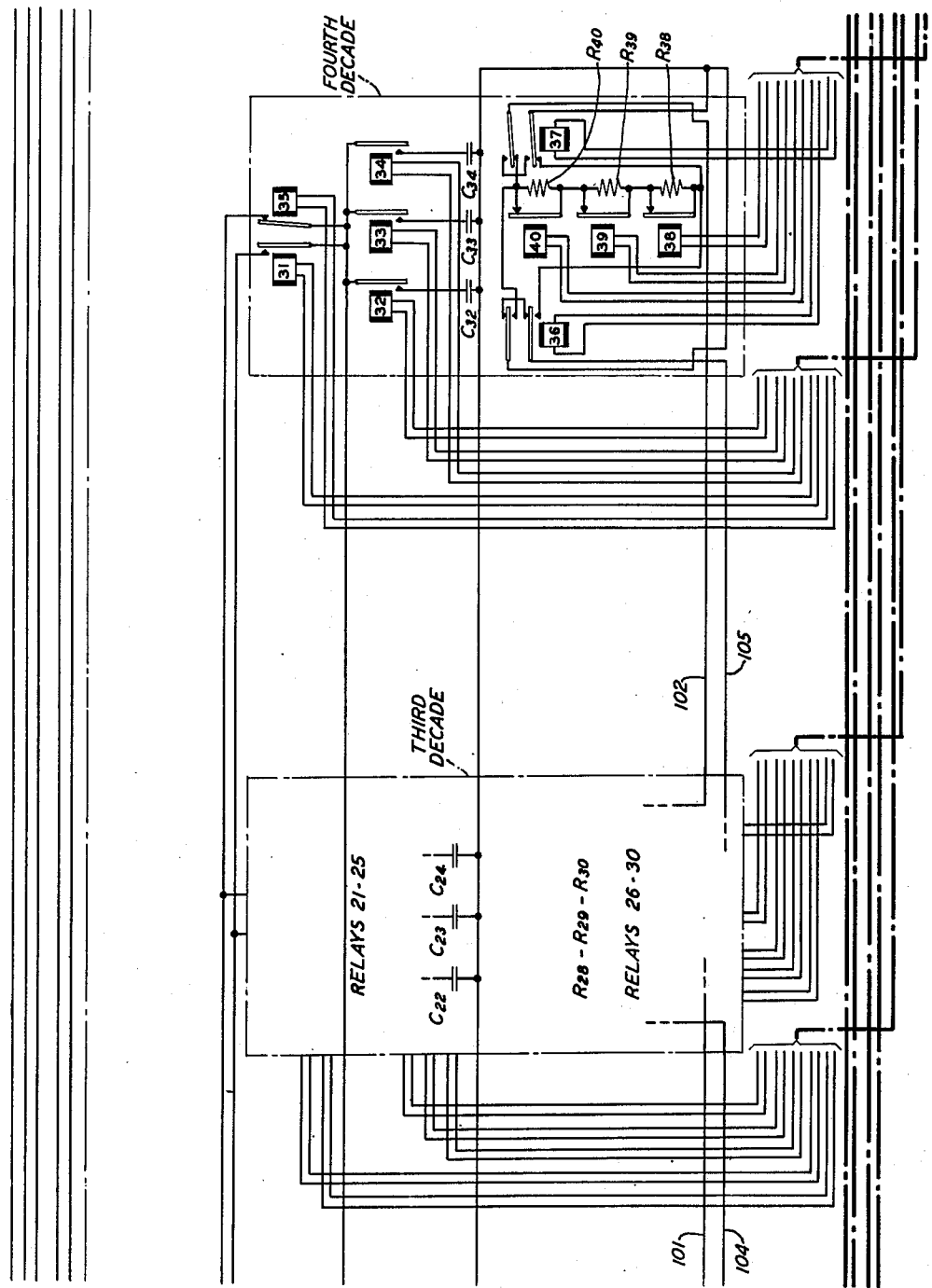
Figure 3:
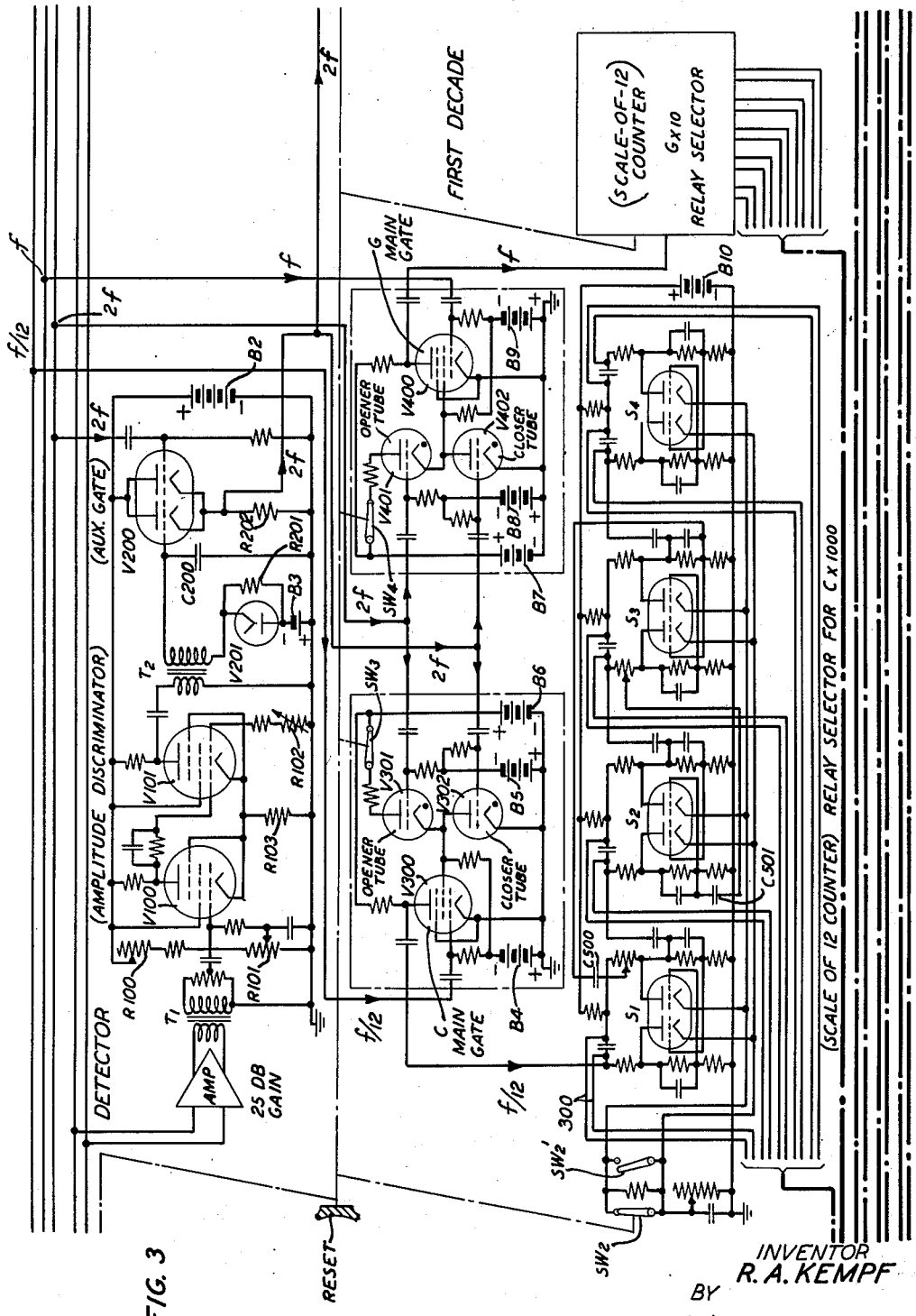

The manner in which the various relays are caused to automatically balance the bridge will be understood by reference to Fig. 3 in combination with Figs. 1 and 2.

Referring first to Fig. 3 it will be noted that it disclosed four well-defined circuit structures. The first of these is the detector or the amplitude discriminator which comprises vacuum tubes V100 and V101 in conjunction with a preamplifier having an arbitrary gain of 25 decibels. The second circuit structure comprises the auxiliary gate including vacuum tube V200 and rectifier V201. This gate may be considered as part of the detector. The third circuit structure comprises a pair of main gates denoted "C Main Gate" and "G Main Gate." The capacitance main gate comprises a gate tube V300, an opener tube V301 and a closer tube V302. In the conductance main gate circuit the main gate comprises vacuum tube V400 and opener and closer tubes V401 and V402, respectively. The fourth circuit structure comprises a pair of relay selector circuits, one for the capacitance unit and one for the conductance unit of the first decade. The circuits for the capacitance unit are shown in detail and those of the conductance unit are identical therewith. The relay selector circuit for the capacitance unit comprises four selector tubes or stages $S_1$, $S_2$, $S_3$ and $S_4$.

Figure 4:
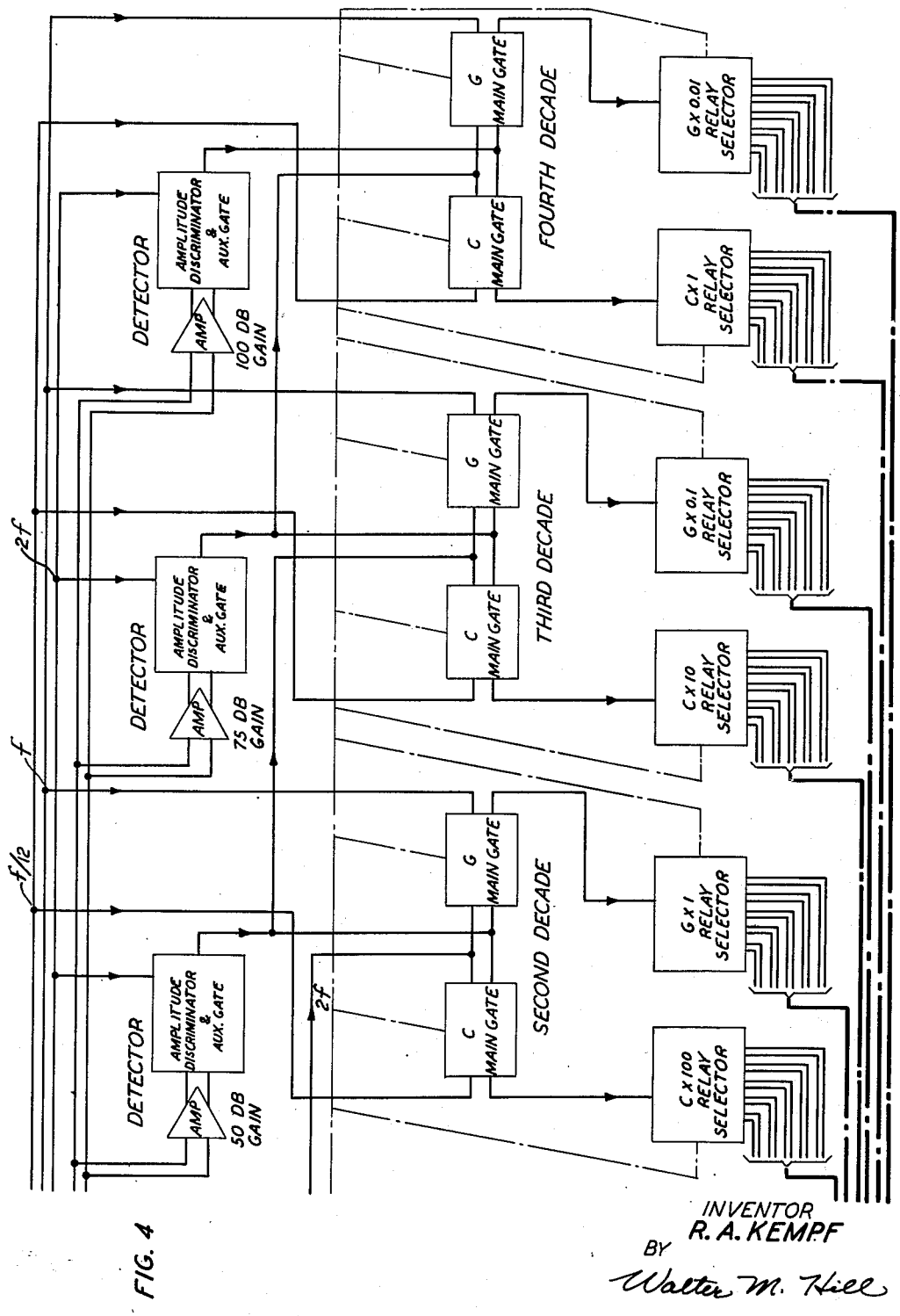

The circuits for the second, third and fourth decades are shown in block form in Fig. 4 and are each respectively identical with those shown for the first decade in Fig. 3. The only two significant differences between these circuits are the different manner in which the opener tubes of the second, third and fourth decades receive their starting pulses and the differences in gain required for the detectors. These will be brought out more clearly in the detailed description of the circuits of Fig. 3.

The circuits of Fig. 3 are operated from pulses derived from a pulse generator shown at the top of Fig. 1. Referring to Fig. 1 it will be seen that this pulse generator comprises a conventional square-wave generator having an output frequency denoted $2f$. This frequency is determined and limited largely by the maximum speed of dependable operation of the relays performing the switching operation. Connected to this generator through a "Start" switch is a scale-of-2 frequency divider tube $V_1$ and another frequency divider circuit denoted "Scale-of-12 Counter." The output frequency $2f$ of the square-wave generator is divided in half by the frequency divider $V_1$. This frequency $f$ is one of the generator output frequencies and is also used as the input frequency of the scale-of-12 counter which again divides the frequency to $f/12$. Thus the pulse generator delivers three different frequencies, $2f$, $f$ and $f/12$ which are carried by the three buses along the tops of Figs. 1, 2, 3 and 4. The $f$ and $f/12$ pulses are positive with respect to ground.

The scale-of-2 counter comprising vacuum tube $V_1$ and its associated circuit is of the conventional Eccles-Jordan type and is disclosed in the book entitled "Time Bases" by O. S. Puckle, page 54 (1943). Essentially this same circuit is also disclosed in the book entitled "Theory and Applications of the Electron Tube" by Herbert J. Reich (1944), page 354. The circuit structure, theory and mode of operation are adequately discussed in these references and no further discussion thereof is necessary in this specification. Vacuum tube diode $V_2$ is so connected as to permit only one negative pulse per square-wave cycle to operate the scale-of-two circuits of tube $V_1$. A switch $SW_1$ is provided to reset the divider so that it always starts with the right half conducting. This switch is mechanically linked with a "Reset" button shown in Fig. 3, this mechanical linkage being denoted by a dot and dash line carried through Fig. 2 from Fig. 1 to Fig. 3. A similar switch for the same purpose is included in the scale-of-12 counter and is also coupled with the same reset button.

The circuit details of the scale-of-12 counter are identical with those shown for the capacitance relay selector in Fig. 3. Consequently these circuits will not be described at this time but the description which is given later for the relay selector circuits of Fig. 3 applies equally to this circuit.

The bridge in Fig. 1 is preferably supplied with a sinusoidal alternating current which should be of constant voltage and of a suitable frequency F. This voltage is applied to the B and D terminals of the bridge. The input to the discriminator amplifiers is received from the bottom two conductors along the top of Figs. 3 and 4, which conductors are connected directly to the A and C terminals of the bridge in Fig. 1. The detectors shown in Figs. 3 and 4 are the control elements for initiating the operations performed by all of the other circuit control elements of their respective decades. Since the voltage of the generator supplying the bridge is held relatively constant, the bridge output voltage will reach a series of determinable and repeatable minimum amplitudes as the decades are brought into successive balance. The relative gain of the preamplifier and the adjustments of the discriminator in the detector circuit of each decade are such as to cease transmitting voltage to the auxiliary gate when the bridge output voltage has decreased to a value just below a predetermined minimum. The auxiliary gate then stops switching in this decade.

The control circuits shown in Fig. 3 are for controlling the operation of the ten relays for the first decade at the left of Fig. 1. These relays will continue to be sequentially operated by pulses of frequency $f$ and $f/12$ until the output voltage of the bridge as received by the preamplifier in the discriminator circuit of Fig. 3 lowers sufficiently to stop this circuit from operating. This occurs when balance is reached for the first decade.

The input to the amplitude discriminator of Fig. 3 is the amplified sinusoidal unbalance output voltage from the bridge. Vacuum tubes V100 and V101 in the discriminator circuit comprise a "flip-flop" trigger circuit and are so connected that, with a zero signal, tube V101 is conducting and tube V100 is biased to cut-off by the voltage drop across resistor R103 due to current flowing through tube V101. Whenever the bridge unbalance voltage exceeds a predetermined limit, this voltage, which is being applied to the control grid of tube V100, unblocks this tube and causes it to conduct during each positive peak of the sinusoidal input wave. When tube V100 conducts, tube V101 ceases to conduct and vice versa, thus producing the conventional "flip-flop" operation similar to that described in the book "Time Bases" by O. S. Puckle (1943), pages 57 and 58. Another description of this circuit may be found in the Review of Scientific Instruments for October 1947, page 706. The result is that a substantially square-wave output voltage of frequency F is impressed on the primary circuit of transformer T2 only during the period that the bridge output voltage exceeds a predetermined limit.

The predetermined limit is established by the gain of the preamplifier in the discriminator circuit and by the adjustment of resistors R100, R101 and R102. These latter resistors are so adjusted that the two levels referred to in the aforementioned publications nearly coincide. The manner in which these resistors are adjusted is fully described in the article in the Review of Scientific Instruments cited above.

The output voltage derived from the plate of vacuum tube V101 is transmitted to the circuit of rectifier tube V201 by means of transformer T2. When the alternating voltage level in the secondary of transformer T2 has a peak value exceeding the bias voltage supplied by source B3, diode V201 begins to rectify and develop a direct voltage across capacitor C200 with the upper plate positive.

The auxiliary gate circuit comprising vacuum tube V200 operates in substantially the manner described in the article "Cathode Follower Gate Circuit" by J. O. Kurshan published in the Review of Scientific Instruments for September 1947, page 647. Briefly, however, the operation of this circuit as specifically applied to this invention is easily understood by considering the first triode section as a simple direct-current amplifier and the second section as a cathode-follower amplifier. The time constant of capacitor C200 and resistor R201 is long compared to the period of the bridge supply frequency F so that so long as tube V101 of the discriminator circuit is transmitting pulses, the rectified voltage developed across capacitor C200 will maintain the first section of tube V200 in a conducting state. This will maintain a sufficiently large bias voltage across resistor R202 to effectively cut off the cathode-follower section of the tube so that pulses of frequency $2f$ applied to its right-hand grid are not transmitted. When balance is reached for the first decade, the input to the discriminator falls below the critical threshold value and the first section of tube V200 becomes non-conducting, thereby removing the large bias drop across resistor R202. The second triode section of this tube is thus permitted to act as a simple cathode follower to transmit the square-wave pulses of frequency $2f$ impressed on its grid. This constitutes the response of the detector to the balance condition for this decade.

The operation of the amplitude discriminator and auxiliary gate can now be reviewed very briefly in order to fix the functions of this portion of the circuit clearly in mind. Assume that the bridge is in the process of being balanced for the first decade. During this period the unbalance voltage from the bridge is still above the critical threshold value so that tubes V100 and V101 in the discriminator circuit are alternately conducting and developing a substantially square-wave output to the primary circuit of transformer T2. This is rectified by tube V201 and developed as a direct voltage across the capacitor C200 thereby rendering the first section of V200 conducting. The cathode-follower section of the auxiliary gate thereby remains blocked so that no square-wave pulses of frequency $2f$ can be transmitted. As balance is approached, the bridge output voltage reduces below a predetermined critical level. Tubes V100 and V101 then cease to alternately conduct and the charge on capacitor C200 leaks off through resistor R201 and the secondary of transformer T2, thus stopping the flow of current through the first section of the auxiliary gate. The second section becomes unblocked and begins operating as an ordinary cathode follower transmitting pulses of frequency $2f$ from its cathode resistor R202 to the grids of the closer tubes V302 and V402 of the two main gate circuits. As will hereinafter become more clear, the first pulse transmitted by tube V200 immediately stops the operation of the relays in the first decade of Fig. 1. Another path from the cathode-follower resistor R202 may be found going to the opener grids of the second decade on Fig. 4. This pulse thereby simultaneously starts the operation of the switching in the second decade.

The switching control is effected by means of a pair of pentode main gates V300 and V400. The plate output of tube V300 goes to the capacitance relay selector circuit and the plate output of tube V400 goes to the conductance relay selector circuit. The opener and closer tubes V301, V401, V302 and V402 are each preferably of type 884 gas-filled Thyratrons while the two pentodes are preferably type 6SJ7. The two opener tubes are caused to begin conducting by receiving pulses of frequency $2f$ directly from the bus leading to the pulse generator of Fig. 1. These pulses are received by the opener tubes when the "Start" switch of Fig. 1 is closed. It should be noted that this applies only to the first decade. The opener tubes of succeeding decades receive their pulses from the auxiliary gates of their preceding decades as stated in the last paragraph and as is obvious from a mere inspection of Fig. 4. The screen grids of the two pentodes are normally biased to cut-off by voltage derived from sources B4 and B9, respectively. As soon as the two opener tubes become conducting these screen grids are driven positive from current derived from sources B6 and B7 by way of switches SW3 and SW4 and the space paths of the two opener tubes to the respective screens and screen grid resistors. This immediately unblocks these two pentodes and starts the transmission of square-wave pulses of frequency $f/12$ and frequency $f$ to a pair of relay selector circuits for the capacitance section and the conductance section, respectively. These pulses will continue to be transmitted so long as opener tubes V301 and V401 are conducting and closer tubes V302 and V402 are non-conducting.

When the first decade has reached substantial balance pulses of frequency $2f$ are developed across resistor R202 in the manner previously described. These pulses are transmitted to the grids of the two closer tubes V302 and V402 thereby rendering these two tubes conducting. This brings the screen grid voltages of the two gate tubes V300 and V400 to substantially ground potential thereby immediately blocking both of these gate tubes and stopping the transmission of the pulses to the two relay selector circuits.

As previously indicated, the opener tubes of the second decade shown in Fig. 4 receive their square-wave pulses of frequency $2f$ at the same instant that the two closer tubes in the first decade receive their pulses. These pulses, which are derived from the voltage developed across resistor R202 of the auxiliary gate circuit in the first decade, start the switching operation in the second decade in the same manner as already described for the first decade. The only difference in the control circuits of the two decades so far noted resides in the manner in which these starting pulses are received.

Referring again to Fig. 3, it will be noted that the pulses derived from the plate circuits of V300 and V400 will be in a phase opposite from those applied to their grids. The $f$ and $f/12$ pulses from the square-wave generator are positive with respect to ground. Therefore, the output pulses from both main gates V300 and V400 are negative with respect to ground. This polarity is essential for the proper operation of the particular relay selector circuits chosen to illustrate this invention and which are now to be described.

The two relay selector circuits of Fig. 3 are identical so they are shown in detail for only the capacitance selector. These circuits are of the type disclosed in the article entitled "Hexade Scaling Circuit" by E. L. Langberg published in the Review of Scientific Instruments for October 1947, page 796. Briefly, they each comprise three binary Eccles-Jordan stages with special coupling to accomplish forced resetting followed by a single binary stage. In Fig. 3 the first three stages are denoted by reference characters $S_1$, $S_2$ and $S_3$ whereas the last binary stage is denoted by reference character $S_4$. Conduction proceeds in the manner disclosed in the chart shown in Fig. 8 which should be referred to for a better understanding of the operation of this portion of the circuit. The operation will be described in connection with the relay selector for the capacitance component of the first decade, it being understood that the circuits are the same for the conductance relay selector and all the other relay selectors shown in Fig. 4. In using the table of Fig. 8 it should be observed that it only shows the relay numbers, capacitances and resistances for the first decade. The table is conveniently extended to the other three decades by merely noting, for example, that transfer relay 1 of the first decade corresponds with transfer relays 11, 21 and 31 of the next three decades, respectively. Thus any relay number of a given decade is obtained by adding ten to the corresponding relay number of its preceding decade. Moreover, relay 2 switches capacitor $C_2$, relay 13 switches capacitor $C_{13}$ and relay 38 switches resistor $R_{38}$ so the subscript number is the same as the reference number of the corresponding relay.

The circuit is initially prepared for operation by operating the reset switch shown in Fig. 3. This opens switch SW1 in the pulse generator of Fig. 1, switch SW2 in the relay selector circuit now to be described, a similar switch in the scale-of-12 counter in the pulse generator of Fig. 1, switches SW3 and SW4 in the two main gate circuits of the first decade of Fig. 3 and similar switches in the main gates and relay selector circuits of the second, third and forth decades of Fig. 4. Momentarily opening these switches causes tube $V_1$ in the pulse generator to become conducting on the right side hereinafter referred to as "right-conducting" and all of the tubes in the scale-of-12 counters of the pulse generator and in the relay selector circuits of Figs. 3 and 4 to become "right-conducting." At the same time they open the anode circuits of all of the opener and closer tubes in all of the main gate circuits thereby rendering them non-conducting to block all of the main gate tubes. Upon the release of the reset button all of these switches are again closed thereby leaving all of the relay selector tubes such as $S_1$, $S_2$, $S_3$ and $S_4$ "right-conducting."

In Fig. 8 the column headed "Stage No. Conducting" have subheadings $S_1$, $S_2$, $S_3$, $S_4$ corresponding with the tubes in the relay selector circuit of Fig. 3. In the body of the table the letters R and L refer to "right" and "left" conducting, respectively, meaning that the right half of the tube or the left half of the tube is conducting. Since the circuits associated with each of these stages are such as to give each stage two states of stable equilibrium, either one half of the tube or the other half of the tube is conducting at any instant and there is no substantial period during which both sides are conducting.

Referring again to Fig. 8, it will be noted that in the first column the first line contains the word "Reset." This refers to the operation of the reset button previously described. It will also be noted that after the circuit is reset, the table shows that all four stages are "right-conducting." When the first pulse is received by stage $S_1$ it becomes left-conducting without in any way affecting the remaining three stages. When the second pulse is received the first stage becomes right-conducting, thus transmitting a pulse to the second stage and causing it to be left-conducting. Upon receiving the third pulse the first stage becomes left-conducting again without affecting the remaining stages. Upon receiving the fourth pulse the first stage again becomes right-conducting, reversing the second stage to right-conducting and transmitting a pulse to the third stage rendering it left-conducting. Upon receiving the fifth pulse, the first stage $S_1$ becomes left-conducting leaving the remaining stages unchanged. Were it not for the coupling through capacitor C500 from the anode circuit of the first stage to the grid circuit of the third stage and a similar coupling through capacitor C501, the sixth pulse would cause the stages to conduct differently from that shown in the table of Fig. 8. In fact without these couplings the sixth pulse would have caused the first stage to become right-conducting, the second stage to become left-conducting, leaving stages $S_3$ and $S_4$ left-conducting and right-conducting, respectively.

In order to perform the switching operations desired in this invention, it is necessary that the sixth pulse leave the second stage unchanged but permit both the third and fourth stages to change. By means of the coupling provided by capacitor C500, when stage $S_1$ is reversed by the sixth pulse, a negative pulse obtained from the plate circuit of the right side of this stage is fed through capacitor C500 to the grid of the left half of stage $S_3$. This drives the grid of stage $S_3$ negative and causes this stage to switch over to right-conducting. At the same time a positive pulse obtained from the left anode of stage $S_3$ is transmitted by way of capacitor C501 to the right-hand grid of stage $S_2$ where it overwhelms the negative pulse fed into this stage from stage $S_1$. Stage $S_2$, therefore, remains right-conducting. Therefore, by means of these two coupling capacitors C500 and C501 the sixth pulse will leave the stages conducting in the manner shown in Fig. 8.

Each time stages $S_1$, $S_2$ and $S_3$ become left-conducting, current flows from source B10 of Fig. 3 through a pair of conductors, such as conductors 300, to their corresponding relays 2, 3 or 4 in Fig. 1 by obvious paths easily traced from Fig. 3, through Fig. 2 to Fig. 1. This current maintains each relay energized so long as its associated relay selector stage is maintained left-conducting. Stage $S_4$ has two such pairs of conductors corresponding with conductors 300 of the first stage, one pair for each side of the tube. These conductors are connected to relays 1 and 5 of Fig. 1. When stage $S_4$ is left-conducting, transfer relay 1 is energized, whereas if this stage is right-conducting, transfer relay 5 is energized. It will thus be evident that the first three stages cause the operation of relays 2, 3 and 4 while the fourth stage causes the operation of the two transfer relays 1 and 5.

Referring again to the table, Fig. 8, it will be noted that under the first column headed "Relays Operated" relay 5 is energized after the reset button has been operated. As the succeeding pulses are received by the capacitance relay selector circuit, the various relays indicated in this column are operated in the order indicated. When the sixth pulse is received, transfer relay 5 is deenergized and transfer relay 1 is operated. The cycle of operation of the first three stages of the relay selector circuit is then repeated in exactly the same manner as for pulses 1 to 5, inclusive. When the twelfth pulse is received the transfer relays are restored to their original condition with relay 5 operated and relay 1 deenergized.

The circuits of the conductance relay selector are operated in precisely the same manner as just described for the capacitance selector. Reference is made to the second column headed "Relays Operated" in Fig. 8. It must be remembered that the operating speed for these relays is twelve times that for the capacitance relays since they are pulsed at frequency $f$ whereas the capacitance relays are pulsed at frequency $f/12$. Thus the conductance selector completes one cycle of twelve steps for each step of the capacitance relay selector.

The essential circuits of this apparatus have all been described in sufficient detail to thoroughly understand the invention. The operation of the switching system through a typical cycle will now be described.

With the "Start" switch of Fig. 1 open, the reset button of Fig. 3 is operated and released. This prepares all the circuits for operation in a predetermined sequence and renders the gate opener and closer tubes non-conducting in the manner already described. Referring to Fig. 8 it will be noted that since all of the relay selector tubes are now right-conducting, transfer relays 5 and 7 and all the transfer relays in the remaining decades are operated. A network to be tested is connected to the test terminals $Y_x$ of Fig. 1. The "Start" switch of Fig. 1 is then closed, thus enabling the square-wave generator to deliver the three square-wave output frequencies $2f$, $f$ and $f/12$.

The first pulse to be effective will be a positive pulse of frequency $2f$ which will immediately operate gate opener tubes V301 and V401 of the first decade. A short time later the $f$ bus will receive its first pulse. This pulse and all succeeding pulses of the same frequency are fed through the conductance main gate V400 to the conductance relay selector circuit. Here the pulses will start the sequence of opening the contacts of relays 8, 9 and 10 in the sequence indicated in Fig. 8, the first pulse operating relay 10, the second pulse operating only relay 9, the third pulse operating both relays 10 and 9, the fourth pulse operating relay 8, and so on. This switches various conductance values (in the form of resistances) into the C—D arm of the bridge. When the sixth pulse is received, relays 7, 8 and 10 are deenergized and transfer relay 6 is operated. The succeeding pulses then start the sequence of relays 8, 9 and 10 as before to switch the conductance values into the A—D arm of the bridge. The twelfth pulse will start the cycle over again if balance has not been obtained. Simultaneously with the twelfth pulse of frequency $f$, the $f/12$ bus receives its first pulse from the pulse generator which passes through the opened gate V300 to the capacitance selector circuit operating relay 2 of Fig. 1. The succeeding twelve pulses of frequency $f$ allow trial of all ten values of conductance against the capacitance of capacitor $C_2$. If balance is not reached the twelfth pulse of frequency $f$ starts another cycle of operation for at this instant the second $f/12$ pulse is received to release relay 2 and operate relay 3 so that the succeeding twelve pulses again try all ten values of conductance against the capacitance of capacitor $C_3$ in Fig. 1.

If both the capacitance and conductance of the unknown admittance connected to the bridge are within the range of the bridge, substantial balance for the first decade will sometime be reached by this automatic sequence of operation. When this condition is reached the bridge output voltage will drop to a threshold level which can be predetermined either by calculation or by trial. Resistors R100, R101 and R102 of the amplitude discriminator are the threshold controls and are assumed to have been adjusted so that when the predetermined balance level is reached auxiliary gate V200 is caused to open. The first pulse from the $2f$ bus to arrive at the grid of V200 after it has opened will pass to the gate closer tubes V302 and V402 thereby instantly blocking the main gates V300 and V400. This pulse also continues on to the gate opener tubes of the second decade in Fig. 4, thereby immediately starting the same cycle of operation in this decade.

auxiliary gate is opened and a pulse frequency of 2f is transmitted to its closer tubes and also to the opener tubes of the third decade and so on until all four decades have come to balance.

Each time balance is reached for a decade the bridge output level will fall to a lower value for the next decade balance so that more gain is required of the preamplifier of the succeeding discriminator stage. A suitable margin for the discriminator operation may be achieved by giving the amplifier for the first decade an arbitrary gain of 25 decibels as indicated in Fig. 3. Each of the succeeding preamplifiers in Fig. 4 are given an additional 25-decibel gain so that the second preamplifier will have a gain of 50 decibels, the third 75 decibels and the fourth 100 decibels. It must be understood that these relative gains are illustrative only and not restrictive.

To further clarify the mode of operation of this circuit a typical example with numerical values may be considered. Assume that the unknown admittance is that of a 300-foot length of lead covered cable containing No. 22 gauge conductor pairs. Such a cable may have a capacitance of approximately 3954 micromicrofarads and a conductance of approximately 0.094 micromhos. If it be assumed that the standard capacitors and resistors in the several decades have the values previously used for illustrative purposes, the bridge will come to balance as follows:

When the circuit is started in the manner previously described, the conductance relay selector will go through one complete cycle of operation without having reached balance since an insufficient capacitance has been connected in the circuit. Upon starting the second cycle of operation the relay 2 will have been operated so that a capacitance of 1000 micromicrofarads provided by capacitor $C_2$ will be connected in the C—D arm of the bridge as shown by the table of Fig. 8. The conductance relay selector will then start through another cycle and continue to operate until the tenth pulse is received at which time 40 ohms provided by resistor $R_3$ are inserted in the A—D arm of the bridge. This amounts to substantial balance for the first decade so its operation is automatically stopped and transferred to the second decade.

The second decade starts out with transfer relays 15 and 17, corresponding with relays 5 and 7, operated. With only relay 15 operated in the capacitance section, the conductance relay selector goes through one complete cycle of operation without reaching balance for the second decade. Relay 12, corresponding with relay 2 of the first decade, is then operated. This connects capacitor $C_{12}$ having a capacitance of 100 micromicrofarads across the C—D arm of the bridge. Immediately thereafter the conductance relay selector starts through another cycle of operation. When it receives its seventh pulse, relay 20, corresponding with relay 10 of the table in Fig. 8, is operated. This connects a resistance of 1 ohm in series with the A—D arm of the bridge and results in substantial balance for the second decade. Switching for the second decade is thus automatically stopped and transferred to the third decade.

The conductance relay selector of the third decade goes through eleven cycles of operation without having reached balance. When it starts its twelfth cycle, however, the capacitance selector is advanced by its eleventh pulse to connect a capacitance of 50 micromicrofarads into the A—D arm of the bridge as indicated by Fig. 8. This is the correct amount of capacitance for this decade so that as the conductance selector receives its fourth pulse to operate relay 28 and connect a resistance of 0.40-ohm in series with the C—D arm of the bridge, substantial balance results for the third decade, thereby stopping switching for this decade and transferring to the fourth decade.

In the fourth decade the conductance relay selector goes through ten cycles of operation without reaching balance. When it starts its eleventh cycle, the capacitance selector is advanced by its tenth pulse to switch 4 micromicrofarads across the A—D arm of the bridge. This is the correct amount of capacitance for the last decade. Thereafter all switching will be stopped when the conductance relay selector receives its fifth pulse thereby connecting a resistance of 0.05 ohm in series with the C—D arm of the bridge to complete the balance for all four decades.

Since the closer tubes in the main gates of all four decades are conducting, all switching is stopped and the bridge is completely balanced for both components. The capacitances and resistances connected in the two arms of the bridge for the example just described are shown for convenience in the table below.

TABLE

| Decade | Capacitances ($\mu\mu$f.) | | Resistances (Ohms) | |
| --- | --- | --- | --- | --- |
| | A—D | C—D | A—D | C—D |
| 1st | | 1,000 | 40.00 | |
| 2nd | | 100 | 1.00 | |
| 3rd | 50 | | | 0.40 |
| 4th | 4 | | | 0.05 |
| Permanently connected | 5,000 | | 10,000.00 | 10,050.00 |
| | 5,054 | 1,100 | 10,041.00 | 10,050.45 |

By applying equations (1) and (2) it will be found that the capacitance $C_x$ is equal to the difference between 5054 micromicrofarads and the 1100 micromicrofarads given in the table above or 3954 micromicrofarads. The conductance $G_x$ is similarly found to be equal to 0.094 micromhos.

The apparatus is reset by merely operating the reset button shown in Fig. 3 which opens a plurality of switches to distribute conduction through the proper tube sections. This insures that the decades will reach balance in the proper sequence and in the minimum time.

Occasionally measurements are made of a large number of substantially equal structures, as for example, capacitors. Assume that a particular type of capacitor is known to have a capacitance of 2550 micromicrofarads ±50 micromicrofarads with negligible conductance. In this case it would be desirable to have the first two decades preset to 2000 micromicrofarads and 500 micromicrofarads, respectively. Searching for balance then need be done only by the tens and units decades. Such presetting can be accomplished by merely closing a switch $SW_2'$ as shown for the first decade in Fig. 3. A similar switch is understood to exist in each of the other relay selector circuits. In the specific example chosen for illustrating this presetting operation the reset button is operated and released after which the switch $SW_2'$ is closed in the capacitance relay selector circuits of both the first and second decades. The first capacitor is then tested as previously described. However, when the reset button is again operated, the capacitance relay selectors for the first and second decades do not reset. Thereafter when additional capacitors of substantially the same size are placed in the circuit, the capacitance balance will be substantially complete for both the first and second decades so that their auxiliary gates will both be open resulting in switching starting at once in the third decade. Since the conductance value is negligibly small for the example assumed, it is optional whether or not the switches SW2' in the conductance relay selectors are closed.

After the apparatus has reached complete balance it is necessary to determine which standard capacitances and resistances the selector circuits have connected into each bridge arm. The bridge may be "read" in a variety of ways. One method would be to employ neon lamps connected between the relay selector tube plates and ground. These lamps will be illuminated when their tubes are non-conducting; therefore in reading the bridge the neon lamps that are dark are recorded. This type of circuit is conventional and is not shown on the drawing of this application. Another method would be to have the final closer pulse in the fourth decade which stops the bridge operation, also initiate a printing action to print the digits corresponding to the "held" values stored by the relay selector circuits. This amounts to having the printer record every relay 1, 2, 3, etc. which is operated. The circuit to each printing solenoid would be completed through an additional pair of contacts on those relays. A still further method is to empoly a circuit of the type shown in Fig. 6 and an array of numbered indicating lamps as disclosed in Fig. 7.

Referring to Fig. 6, the relays may represent the five relays in the capacitance section of the first decade. Referring to Fig. 1 is will be noted that there are five relays in the capacitance unit and also five relays in the resistance unit in the first decade and consequently the same number of relays in each of the succeeding decades. Exactly the same circuit as shown in Fig. 6 is employed also for the resistance unit of the first decade and the reference numerals in parentheses adjacent the relay windings correspond with the numbers of the relays in the resistance unit. These relays in Fig. 6 may be additional relays with their windings connected in parallel with the corresponding numbered relays in the bridge circuit or they may be the same relay windings with additional contacts. That is to say, the contacts shown in Fig. 6 are in addition to those shown in Fig. 1 and may be mounted on the same relay structure. They are separated here for the sake of clarity. To have included all these contacts in Fig. 1 would have confused the drawing and would have made the invention much more difficult to understand.

It will be observed that to the right of the relays in Fig. 6 there is a pair of vertical rows of lamps numbered from 0 to 5. The left-hand column corresponds with the A—D arm of the bridge whereas the right-hand column corresponds with the C—D arm of the bridge. The transfer relays 1 and 5 determine which column of lamps will be illuminated. Energy for illuminating these lamps is obtained from a battery B11. The circuits are very obvious and a detailed description is not believed necessary except to point out the fact that should the capacitance be zero for both arms of a particular decade both of the zero lamps will be illuminated. This causes no confusion since the value is zero anyway. Of course, if either relay 2, 3 or 4 is operated, the capacitance value would not be zero so that by means of a series path through normally closed contacts on each of these three relays the zero lamps are both extinguished. Thus the reading is zero for any vertical row in which either the zero lamp is lighted or all lamps are dark. By comparing various combinations of operated relays as shown in Fig. 8 with the circuit diagram of Fig. 6, it will be evident that, except for the zero lamps, only one lamp in a decade unit will be lighted at a time to indicate the value of capacitance (or resistance) switched into the indicated bridge arm. For example, from Fig. 8 it is observed that when relays 2, 3 and 5 are operated, 3,000 micromicrofarads are switched across the C—D arm. Referring now to Fig. 6 is will be noted that when relays 2, 3 and 5 are operated, a circuit path extends from battery B11 through the "Read" switch, through the second pair of contacts on each of relays 2 and 3, then by way of an obvious path to the junction between the two No. 3 lamps, through the No. 3 lamp in the C—D column, through the closed contacts of the transfer relay 5 and to the battery by way of ground. Similarly, it will be found that the No. 1 lamp in the C—D column is dependent on relays 2 and 5 being operated, the No. 2 lamp in the A—D column is dependent upon relays 3 and 1, and so on.

A convenient arrangement of the lamps is shown in Fig. 7. It will be noted that there are four columns of lamps, each having four vertical rows. These four vertical rows correspond with the four decades of the bridge. The first two columns are capacitive columns and are for the A—D and the C—D bridge arms, respectively. Similarly, the other two columns are for indicating resistance values for the two arms of the bridge and the two vertical rows in each also correspond with the four decades of the bridge. The capacitance values for the A—D arm are read by simply reading the illuminated lamp in each column from left to right, remembering that if no lamp is illuminated in a column the reading is zero. Thus, for the illustrative example given above involving the 300-foot length of lead-covered cable, the values given in the table would be read on the lamp arrangement of Fig. 7 as follows: In the first column headed A—D of Fig. 7, no lamp in the first vertical row would be illuminated. There also would be no lamp illuminated in the second vertical row. (This is because for the first two decades the No. 1 lamps are illuminated in the C—D column.) In the third vertical row the No. 5 lamp will be illuminated and in the fourth vertical row the No. 4 lamp will be illuminated, thus giving a reading of 54 micromicrofarads connected across the A—D arm of the bridge. Adding the 5000 micromicrofarads of $C_1$ gives a total of 5054 micromicrofarads. In the C—D column only the No. 1 lamp in each of the first two vertical rows will be illuminated giving a reading of 1100 micromicrofarads connected across the C—D arm. The resistance lamps are read in the same way.

The invention has been necessarily described in connection with a specific embodiment of the invention. However, it is to be understood that the above-described arrangements are only illustrative of the application of the principles of the invention. Numerous other arrangements may be devised by those skilled in the art without departing from the spirit and scope of the invention. The functions of most of the circuits can be performed by other conventional types of circuitry. This is most obviously true of the relay selector circuits. Here conventional ring-type counter circuits could be used instead of the cascaded Eccles-Jordan type of trigger pairs. Six tubes would comprise a scale-of-6 counter with conduction occurring in successive tubes as pulses arrive at the counter. The A—D and C—D transfer would have to be handled by an Eccles-Jordan stage pulsed by the sixth tube of the ring. Of course, electromagnetic sequence switches could also be used but they are slower in operation and require more power. Another type of circuit structure which may be employed for switching is the electronic beam-switching tube disclosed in the article entitled "Electrostatically Focused Radial Beam Tube" by A. M. Skellett, published in the Proceedings of the Institute of Radio Engineers for November 1948, page 1354. This is also disclosed in United States Patents 2,217,774 and 2,433,403 granted October 15, 1940 and December 30, 1947 to Albert M. Skellett.

What is claimed is:

1. A system for automatically balancing an electric bridge comprising a plurality of standard circuit elements of one kind, a plurality of standard circuit elements of another kind, a selector switching means connected to the first kind of elements so constructed and arranged as to sequentially switch said elements into balancing relation with the bridge through a series of steps comprising a cycle of predetermined combination and order, another similar switching means for said other kind of elements, a control circuit structure connected to said two switching means for causing one of said switching means to switch through its cycle once for each switching step of said other switching means, a detector for connection to said bridge and responsive to substantial balance thereof and a circuit means connected with said detector and said control circuit so constructed and arranged as to automatically stop both of said switching means upon response of said detector.

2. The combination of claim 1 wherein said control circuit structure comprises a generator producing a plurality of pulses of integrally related frequencies and a pair of electronic gate circuits connected to said generator, each gate being under control of a different pulse frequency, one gate circuit connected to transmit operating pulses to the first-named switching means, the other gate circuit similarly connected to the second-named switching means, said first gate circuit transmitting more pulses than the second one by a factor equal to the number of steps in said cycle.

3. The combination in accordance with claim 1 and an indicator means connected to said selector switching means for indicating which standard circuit elements are connected to the bridge.

4. A system for automatically balancing an electric bridge comprising a plurality of standard circuit elements of one kind arranged as successive decades, a plurality of standard circuit elements of another kind also arranged as successive decades, a separate selector switching means connected to each decade of the first kind of elements so constructed and arranged as to sequentially switch its elements into balancing relation with the bridge through a series of steps comprising a cycle of predetermined combination and order, another similar switching means for each decade of said other kind of elements, a separate main gate circuit connected to each selector switching means having a pulse input, a gate-opening and a gate-closing terminal, each gate circuit, when open, being adapted to advance its associated selector switch one step of its cycle for each electric pulse which is transmitted by said gate, the largest decades of the two kinds of standard elements and their associated switching means and gate circuits comprising the first decade pair, the next largest the second decade pair, etc., a pulse generator having at least three output frequencies and a terminal for each frequency, circuits connecting one generator terminal to one pulse input terminal of each decade pair and another generator terminal to the remaining pulse input terminals, a separate detector for each decade pair with terminals for connection to the bridge, each detector being responsive to a different degree of bridge balance, an auxiliary pulse gate in each detector adapted to open its gate path upon said response of its detector, a pulse input and a pulse output terminal for each auxiliary gate, circuits connecting a third generator terminal to the pulse input terminal of each auxiliary gate and to the two gate-opening terminals of the first decade pair, and other circuits connecting the pulse output terminal of each auxiliary gate to the two gate-closing terminals of its own decade pair and to the gate-opening terminals of the next succeeding decade pair.

5. The combination in accordance with claim 4 and an indicator means connected to said selector switching means for indicating which standard circuit elements are connected to the bridge.

RAYMOND A. KEMPF.

REFERENCES CITED

The following references are of record in the file of this patent:

UNITED STATES PATENTS

| Number | Name | Date |
| --- | --- | --- |
| 2,116,606 | Lemmon | May 10, 1938 |
| 2,283,072 | Leathers | May 12, 1942 |
| 2,369,070 | Nielsen | Feb. 6, 1945 |
| 2,440,200 | Jofeh | Apr. 20, 1948 |